Dec. 26, 1961  W. O. BRIGGS  3,014,750
EASY HOLD SHOVEL HANDLE
Filed March 27, 1959

INVENTOR.
WILLIAM O. BRIGGS
BY

United States Patent Office

3,014,750
Patented Dec. 26, 1961

3,014,750
EASY HOLD SHOVEL HANDLE
William O. Briggs, 1027 N. Ardmore Ave.,
Hollywood 29, Calif.
Filed Mar. 27, 1959, Ser. No. 802,539
1 Claim. (Cl. 294—58)

This invention relates to hand tools and more particularly to a handle assembly therefor.

It is an object of the present invention to provide a comfortable handle for use with various types of hand tools, such as shovels, scoops, spades, and the like, that substantially reduces the strain and effort when using such tools.

Another object of the present invention is to provide a comfortable handle for various types of hand tools of the above type that will substantially increase the capacity of the worker without imparting additional strain or discomfort thereto.

Other objects of the invention are to provide a tool handle bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
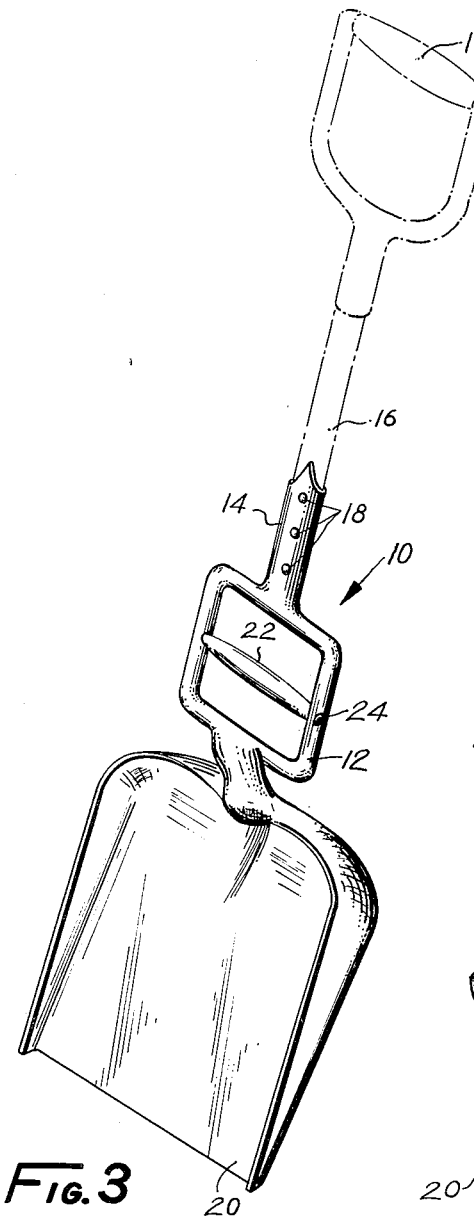
FIGURE 1 is a perspective view of a shovel embodying a handle unit made in accordance with the present invention.
Figure 2:
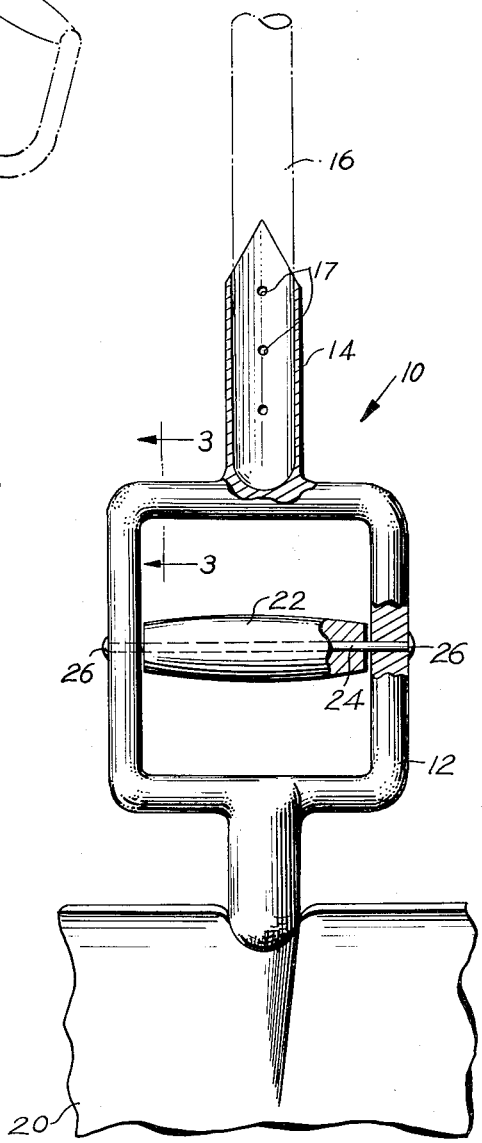
FIGURE 2 is an enlarged fragmentary end elevational view, partly in section, of the unit shown in FIGURE 1.
Figure 3:
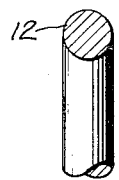
FIGURE 3 is an enlarged transverse cross sectional view taken along line 3—3 of FIGURE 2.

Referring now more in detail to the drawing, a handle assembly 10 made in accordance with the present invention is shown to include a main frame 12 which is in the form of an annular member of substantially rectangular outline having a pair of spaced apart parallel sides and a pair of spaced apart parallel ends. This frame is integral with the scoop 20 of the shovel (or any other hand tool), and includes a hollow sleeve 14 that extends upwardly from one of the ends and receives the lower end of a connecting shaft 16. A handle 17 integral with the opposite end of the connecting shaft 16 forms a hand grip for the other hand of the operator. This sleeve 16 is secured to the shaft 16, in any suitable manner, such as by rivets 18 that extend through provided openings 17 in the sleeve 14.

The frame 12 also includes a hand grip 22 in the form of a substantially cylindrical member that is rotatably supported upon a bearing pin 24 carried upon the opposite sides of the main frame, and secured in assembled relationship therewith by means of upset heads 26. The hand grip 22 is secured to the sides of the main frame in equally spaced apart relationship with the opposite ends of such frame.

In actual use, the workers uses one hand to grip the hand grip 22 within the main frame 12, which serves as a pivotable fulcrum that reduces any friction or discomfort upon the wrist or forearm. The other hand is used to grip the upper handle 17 in a well known manner.

It will now be recognized that the use of this handle assembly minimizes fatigue that ordinarily occurs within the muscles and wrist and forearm, simply by minimizing any twsting and straining forces resulting from continued use of a hand tool with the arms held in an un-natural manner. It will also be appreciated that this type of handle assembly may be readily incorporated in any other hand tool, such as a spade, gardening fork, rake, or the like.

While various changes may be made in the detail construction, it shall be understood that such changes shall be within the spirit and scope of the present invention as defined by the appended claim.

What I claim as new and desire to protect by Letters Patent of the United States is:

A handle assembly for hand tools comprising in combination, a main frame integral with said hand tool, a hand grip carried by said main frame, a hollow sleeve extending upwardly from one end of said main frame at the center thereof and receiving one end of an elongated shaft therewithin, integral fastening means securing said shaft within said sleeve, and a handle integral with the opposite end of said shaft.

References Cited in the file of this patent
UNITED STATES PATENTS

| | | |
|---|---|---|
| 161,678 | Gardner | Apr. 6, 1875 |
| 304,067 | Boyles | Aug. 26, 1884 |
| 344,890 | Wilson et al. | July 6, 1886 |
| 479,661 | Poulson | July 26, 1892 |
| 1,207,472 | Barton | Dec. 5, 1910 |
| 2,210,440 | Avary | Aug. 6, 1940 |